(12) United States Patent
Rose

(10) Patent No.: US 8,434,005 B2
(45) Date of Patent: Apr. 30, 2013

(54) AUDIO/VIDEO INTERFACE AS A SUPPLEMENT TO RADIOLOGY REPORTS

(75) Inventor: Greg Rose, Littleton, CO (US)

(73) Assignee: Rose Radiology, LLC, Greenwood Village, CO (US)

(*) Notice: Subject to any disclaimer, the term of this patent is extended or adjusted under 35 U.S.C. 154(b) by 486 days.

(21) Appl. No.: 12/497,782

(22) Filed: Jul. 6, 2009

(65) Prior Publication Data
US 2010/0011296 A1    Jan. 14, 2010

Related U.S. Application Data

(60) Provisional application No. 61/079,027, filed on Jul. 8, 2008.

(51) Int. Cl.
*G06F 3/00* (2006.01)
*G06F 3/16* (2006.01)

(52) U.S. Cl.
USPC .................. 715/719; 715/723; 715/727

(58) Field of Classification Search .......... 715/719–720, 715/723, 727, 728; 386/96
See application file for complete search history.

(56) References Cited

U.S. PATENT DOCUMENTS

| | | | |
|---|---|---|---|
| 6,031,526 A * | 2/2000 | Shipp | 715/201 |
| 7,038,588 B2 * | 5/2006 | Boone et al. | 340/573.1 |
| 2002/0044129 A1 * | 4/2002 | Leiper | 345/156 |
| 2009/0217150 A1 * | 8/2009 | Lin | 715/232 |

* cited by examiner

*Primary Examiner* — Weilun Lo
*Assistant Examiner* — Truc Chuong
(74) *Attorney, Agent, or Firm* — Cassie A. Boone, P.C.

(57) ABSTRACT

A method for generating an audio/video report, to be used with a report of radiographic image(s) is disclosed. The audio/video report is created by the radiologist while generating the report. The audio/video report includes a portion of a screen image selected by the radiologist, as well as the spoken words of the radiologist. The audio/video report is stored in the database with the report for access by clinicians and others. The audio/video report may be used as a tool for teaching interesting cases.

20 Claims, 9 Drawing Sheets

FIGURE 7

AUDIO/VIDEO INTERFACE AS A SUPPLEMENT TO RADIOLOGY REPORTS

PRIORITY CLAIM

This application claims priority to U.S. provisional patent application No. 61/079,027, filed on Jul. 8, 2008.

TECHNICAL FIELD

This application relates to providing a supplemental radiology service beyond the traditional radiology report, namely, a system and method for creating an audio/video "consult" on selected cases.

BACKGROUND

Radiology is a branch of medicine in which various imaging techniques may be employed to diagnose and treat a wide variety of diseases. Named for the radioactive substances used to produce the images, radiologists, also known as clinical radiologists, may employ many techniques for imaging the patient, including magnetic resonance imaging (MRI), computed tomography (CT, or "cat scan"), ultrasonography (US), nuclear medicine (NM), x-ray/plain film, angiography, and fluoroscopy, to name a few. In addition to their medical education, radiologists receive training in reading and interpreting radiographic images.

To facilitate diagnosis and treatment, a patient's physician, such as a general practitioner, may order one or more radiology tests on the patient. A radiology technologist positions the patient before the imaging apparatus and initiates the imaging function, which produces the radiographic image. Rarely, the patient's physician is capable of interpreting the radiographic image. In many environments, such as hospitals and group practices, the task of interpreting the image is left to the radiologist.

With such division of labor prevalent in medicine, the patient is rarely in communication with the radiologist directly. Thus, before interpreting the radiologist images, the radiologist may prefer or require additional patient information from the physician, such as historical information, known symptoms, and other communication obtained by the patient's physician. Once the radiographic image and the additional patient information are received, the radiologist produces one or more reports. The patient physician is able to diagnose and treat the patient, in large part, based upon the report(s).

Radiographic images are ordered in the diagnosis of a number of different patient maladies. While the patient with a common cold may avoid being imaged, patients with broken bones, pregnant women, and cancer patients routinely obtain radiographic images prior to diagnosis or during treatment. The successful operation of a medical facility, such as a hospital or group practice, therefore, depends on the availability of one or more radiologists at all times and the efficient interpretation of radiographic images by the radiologist.

The availability of radiologists and radiology services during weekends and after-hours (e.g. 5:00 p.m.-7:00 a.m.) may be particularly problematic, as many facilities do not have a radiologist present during these hours. Further, many physicians may not have radiology equipment (even x-ray machines) on-site, and may thus send the patient to a radiology laboratory to obtain the images, which are then returned to the diagnosing physician. The delays associated with these conditions may impair the ability of the diagnosing physician to successfully and timely treat the patient.

In the past, radiology clinics principally employed printed film to capture the radiographic image, which the radiologist then physically hung on "view boxes" to illuminate the image. Today, many of the radiographic images generated using the techniques enumerated above may be stored digitally and viewed on computer displays.

Once the radiographic image has been generated, the radiologist conducts a study of the radiographic image, usually, by dictation. One common mechanism used by radiologists dictating radiographic images is known as PowerScribe. (PowerScribe is a product of Nuance Dictaphone Healthcare Solutions of Burlington, Mass.) Where PowerScribe is used, the radiologist would dictate the study by talking into a PowerScribe handset. The radiologist's voice is changed into text, which is then automatically displayed on a video monitor. The study is now ready for the clinician to review.

The clinician reads through the report(s) and selects the radiographic images (there may be several), such as by clicking them with a mouse on the video monitor. If the clinician wants to review the study with a radiologist, the clinician usually calls or sends electronic mail to the radiologist, thus resulting in a delay to completion of the clinician's job. Alternatively, the radiologist may desire a personal interaction with the clinician on the study, such as where new ground is covered. In either case, completion of the study is impaired, due to the different schedules between the radiologist and the clinician, the availability of either party during the other's schedule, and so on.

The coordination issues are compounded when there are multiple clinicians who need to interpret the study. Further, the doctor who originated the study may desire to communicate further with the radiologist. The radiologist may have communicated with one party about the study, only to have to repeat the communication with another party. There may be complicated or learning cases where it would be useful to have the expert radiologist who read the case give a brief video demonstration rather than having to dig through the report to find the images. If the dictating radiologist is not available, a different radiologist (who is likely to be unfamiliar with the case) must start anew, interpret the case, compare his findings to the original reader, and then explain the case to the interested clinician.

Thus, there is a continuing need for a mechanism by which a radiographic study may be repeatedly communicable to multiple parties on an as needed basis.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 7 is a diagram of a patient list filter, including a case tag for audio/video reports, according to some embodiments.

DETAILED DESCRIPTION

In accordance with the embodiments described herein, an audio/video report and a method for generating the report are disclosed. The radiologist generates the audio/video report as a supplement to one or more radiology reports of radiographic image(s). The audio/video report captures a portion of a screen image selected by the radiologist, as well as the spoken words of the radiologist. The audio/video report is stored in a database, along with the radiology report(s), for access by clinicians and others.

The audio/video report provides many benefits to the radiologist, clinician, and even the patient. The audio/video report may be used as a tool for teaching interesting cases, helping the patient to understand the disease process, allowing the audio/video report to be played repeatedly, allowing downloading and inserting of consults into presentations, helping the clinician understand the case faster rather than having to dig through images, and allowing the radiologist to have a more personal presence regarding patient treatment.

Figure 1:
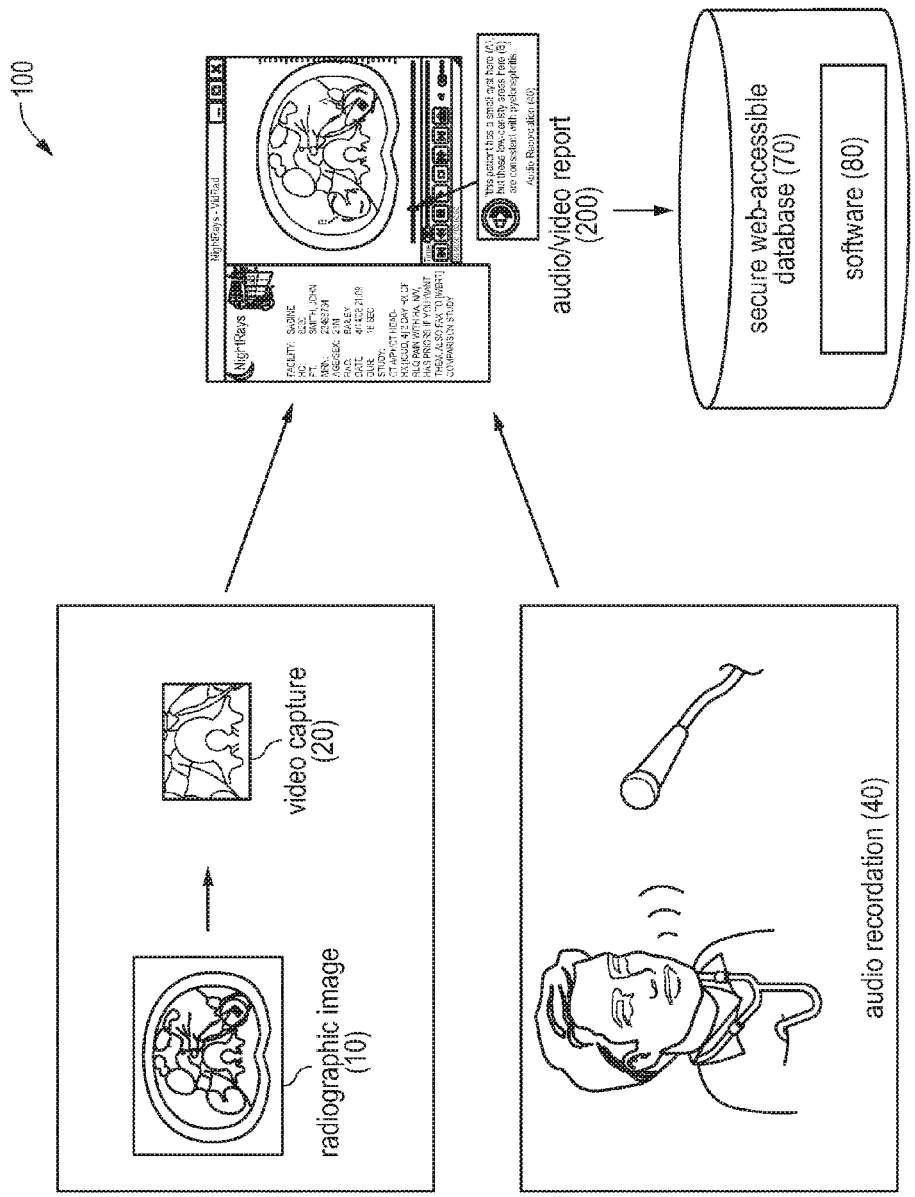
FIG. 1 is a diagram of a method for generating an audio/video report of a radiographic image, according to some embodiments.

FIG. 1 is a diagram of an audio/video report generation method 100, according to some embodiments. The audio/video report generation method 100 consists of video capture 20 and audio recordation 40, to generate an audio/video (A/V) report 200. The A/V report 200 may be stored in a database 70. Optionally, the database 70 includes software 80 for ease of retrieving the audio/video report 200. In some embodiments, the database 70 is a secure, web-accessible database. In a preferred embodiment, the software 80 is a radiology information system (RIS), which includes file sorting and retrieval characteristics. The RIS may include a graphical user interface that facilitates retrieval of the patient data by the clinician. The RIS enables quick access to patient reports, including the audio/video report 200.

A radiologist reviews one or more radiographic images 10 of a patient, whether the images are x-rays, CAT scans, MRIs, and so on. The radiologist may dictate findings into a recording device, after which the audio of his voice is transcribed as text into a radiology report. The radiology report may be a preliminary report, a final report, and so on, of the patient, and there may be multiple radiology reports for a single patient matter. The resulting radiology report is generally shared with other doctors and clinicians, and may be communicated to the patient.

In addition to the radiology report, the audio/video report generation method 100 enables the dictating radiologist an option to create a "video consultation" or audio/video report associated with the dictated case. In some embodiments, the audio/video report 200 is launched from the RIS 80. In other embodiments, the audio/video report 200 is downloaded for distribution to other radiologists and clinicians who have permission to view the case.

In some embodiments, both the radiology report(s) and the audio/video report 200 are stored in a secure web-accessible database 70, such that clinicians, the ordering doctor, and others may study them. The audio/video report 50, along with the radiology report(s), provide a complete or nearly complete description of the radiographic images 10 of the patient. The software 80 preferably facilitates quick retrieval of the radiology report(s) and one or more associated audio/video reports 200, if present.

Figure 2:
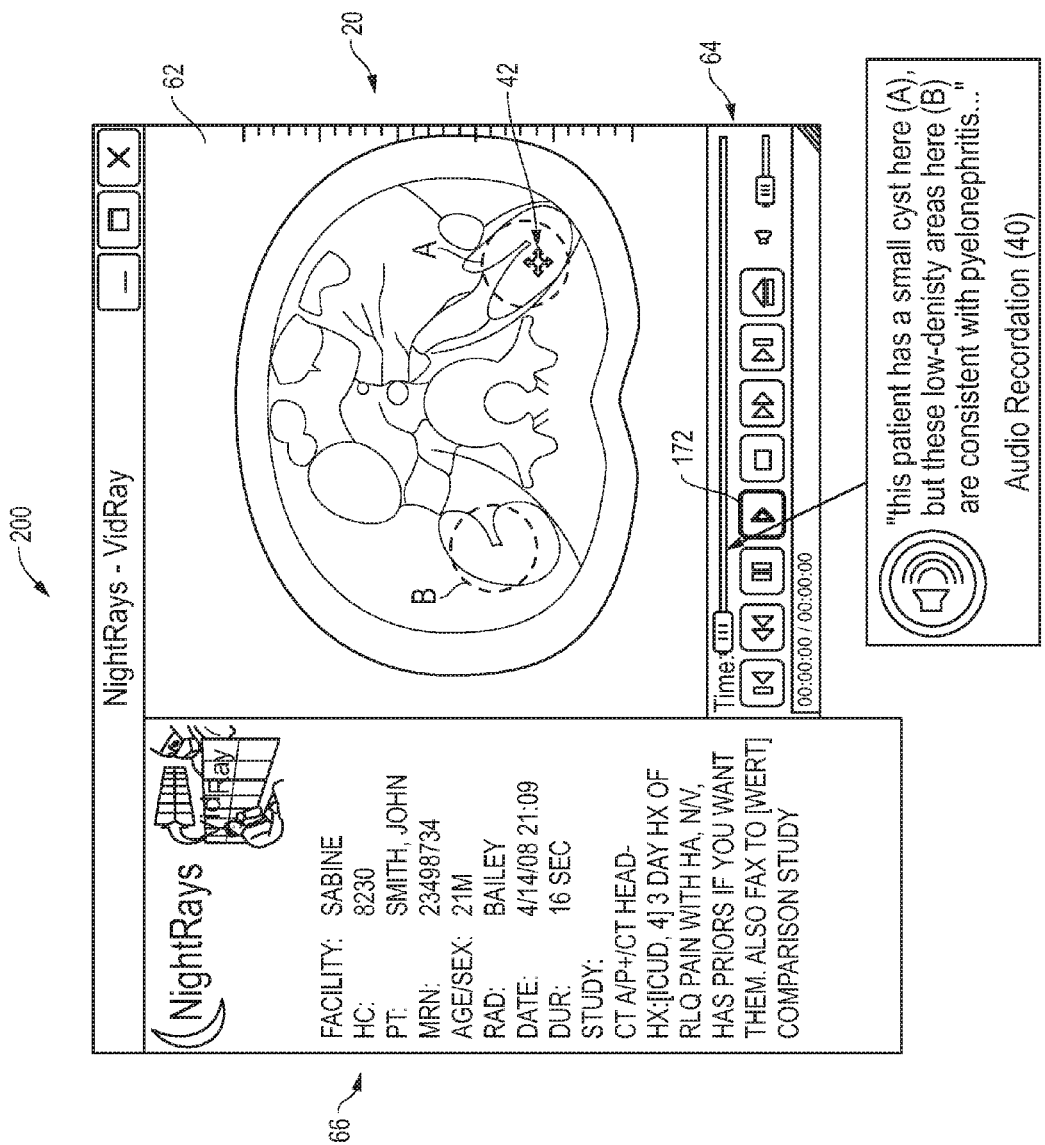
FIG. 2 is a diagram of the audio/video report generated using the method of FIG. 1, according to some embodiments.

FIG. 2 is a diagram the audio/video report 200, according to some embodiments. The audio/video report 200 is a combined audio and video medium produced by the radiologist by recording spoken words and coupling the spoken words with screen images, where the combined audio and video produced by the radiologist are available for later retrieval, such as by clinicians, doctors, students, and so on. In some embodiments, the audio/video report 200 includes still images and/or video and audio. The audio/video report 200 may be retrieved from the secure web-accessible database 70.

As represented in FIG. 2, the A/V report 200 includes the video capture 20 and the audio recordation 40. A red square 62, known herein as a screen capture box, surrounds the video capture portion 20. The audio/video report 200 also includes a control panel 64, which enables the clinician or other viewer to play, as well as to rewind, fast-forward, and stop the audio/video report. When the play indicator 172 is activated (such as by a mouse click), the audio recordation 40 begins playing the voice of the radiologist that was previously recorded. The processor-based system upon which the A/V report 200 is played also includes means for playing the video recording and the audio recording. Simultaneously, the video capture 20 is played. The video capture 20 may include a still radiographic image or moving video.

For example, while recording the A/V report 200, the radiologist may move his mouse to point to relevant portions of a radiographic image. In FIG. 2, the radiologist points to location A of the radiographic image 10 while speaking, "this patient has a small cyst here." Next, the radiologist makes a circular motion at locations B of the radiographic image while speaking, "but these low-density areas here are consistent with pyelonephritis." The audio/video report 200 may highlight parts of the image that the radiologist is discussing particularly, such as by having a circular, square, or other icon superimposed on an area of the image. Or, the audio/video report 200 may include pointers to highlight certain areas of the image, or simply show mouse movement. Persons of ordinary skill in the art recognize a number of different techniques that may be used to denote or underscore certain features of the radiographic image 10. By combining audio and video into a single storable file, the A/V report 200 effectively conveys valuable information about the patient that may be later reviewed by other radiologists, doctors, clinicians, and/or students.

In FIG. 2, the A/V report 200 is embedded within a RIS known as NightRays. The audio/video report 200 is therefore conveniently coupled with a patient history 66. When the clinician plays the audio/video report 200, the report may scroll through several radiographic images while the radiologist is speaking about each image, as one example.

Figure 3:
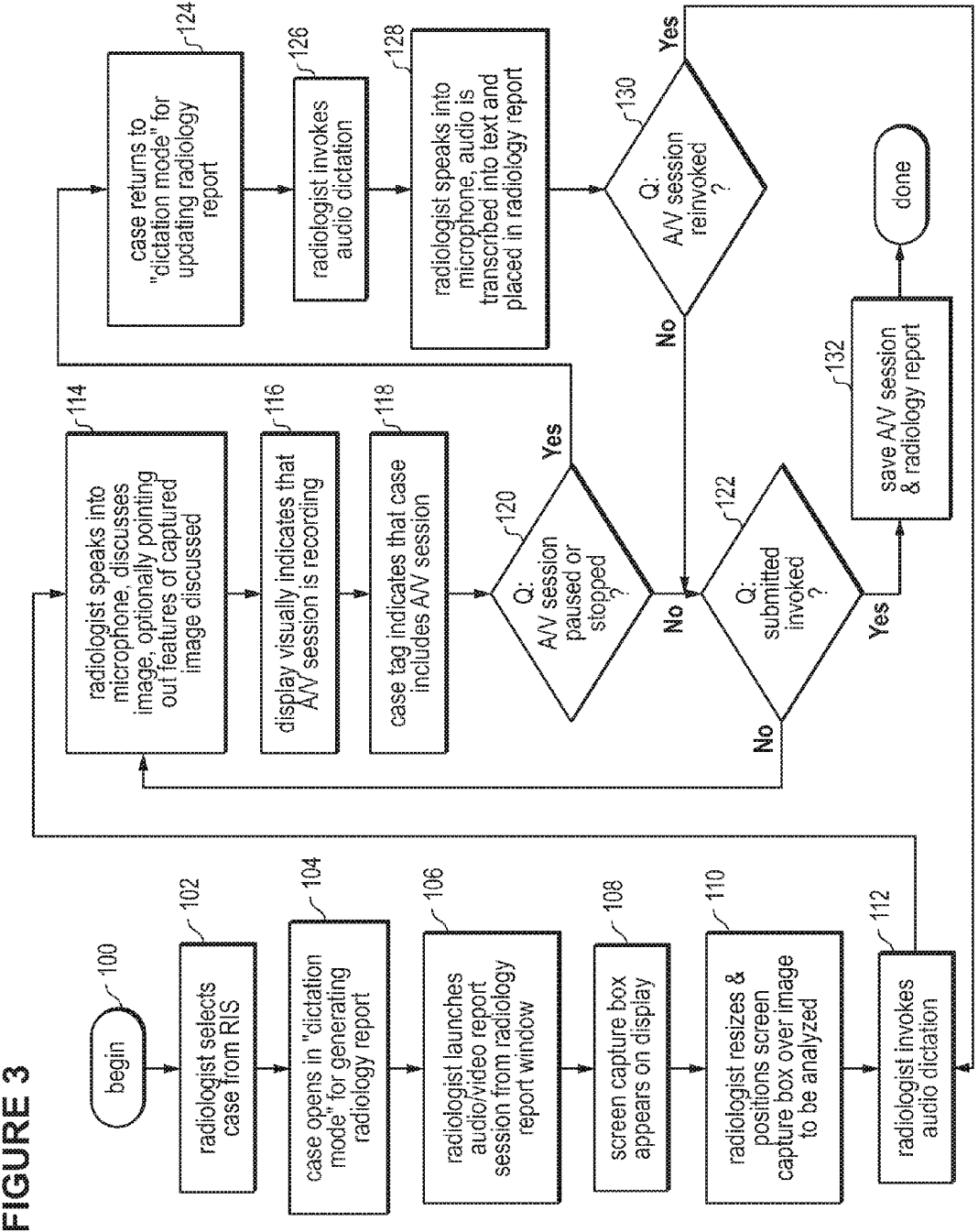
FIG. 3 is a flow diagram showing a process for generating the audio/video report of FIG. 2, according to some embodiments.

FIG. 3 is a flow diagram of the audio/video report generation method 100 of FIG. 1, according to some embodiments. In some embodiments, the audio/video report 200 is generated along with the radiology report. FIG. 3 depicts a preferred embodiment, in which the radiologist toggles between generating the radiology report and generating the A/V report seamlessly. In other embodiments, the A/V report is generated before or after the radiology report.

The A/V report method 100 begins when the radiologist retrieves a patient case from the RIS (block 102). This is the starting point for generating either the radiology report or the A/V report 200. In some embodiments, when opening a patient case, the case is automatically in "dictation mode" for generating the radiology report (block 104). The RIS could also be programmed such that the radiologist is able to generate the A/V report 200. However, the A/V report 200 is ancillary to the radiology report, and every patient case will have a radiology report. Thus, the default configuration is to enable the radiologist to generate the radiology report first. Assuming that he wants to create an audio/video report 200, the radiologist launches the A/V report session 100 from the default window (block 106). In some embodiments, the A/V report may be launched in one of three ways: by selecting a button on a handset, by clicking on a window in the RIS 80, or by selecting a button on a keyboard. The handset implementation is described in conjunction with FIG. 6, below. Where the handset is a PowerScribe handset, a programmable button is used to launch the A/V report mechanism 100. An unused key on the keyboard, such as F10, may be programmed by the software 80 to invoke the A/V report generation 100.

Figure 4B:
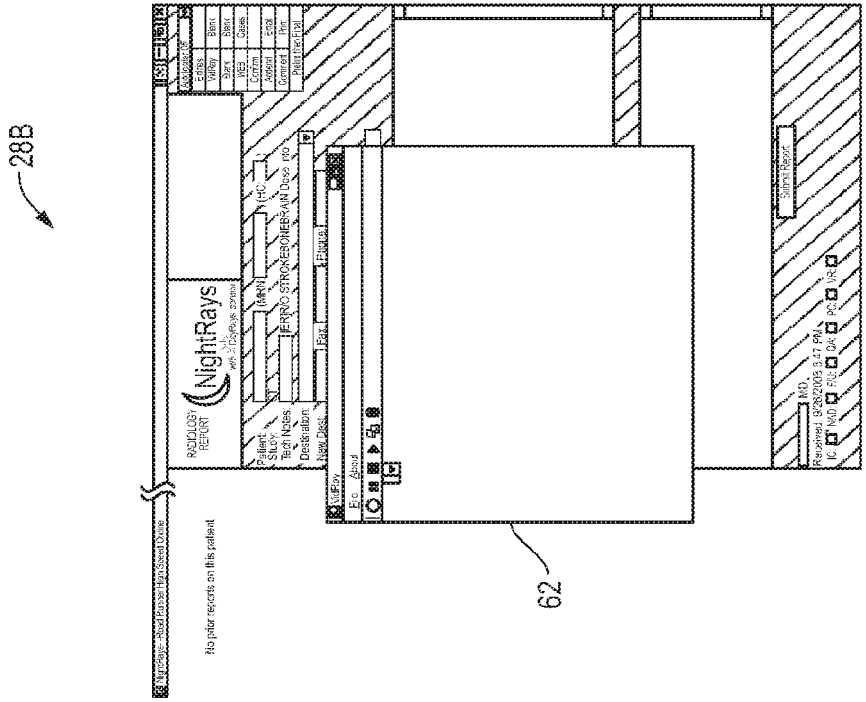
FIGS. 4A and 4B are diagrams of the NightRays RIS (radiology information system) before and after the A/V report generation method of FIG. 1 has been selected, according to some embodiments.
Figure 4A:
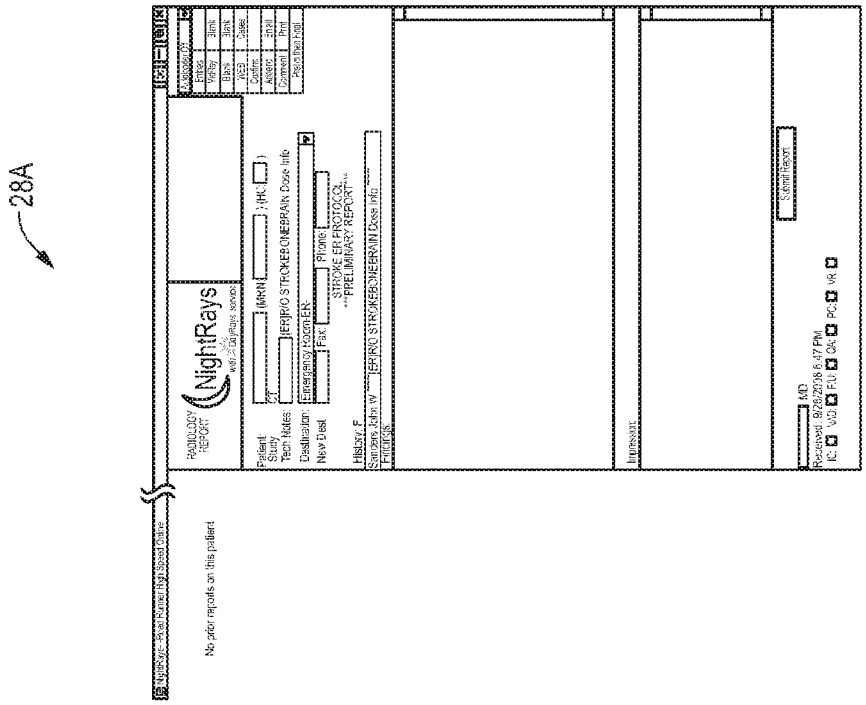

In some embodiments, the RIS 80 provides a visual indicator to the radiologist, such that it is evident whether the software is in a first mode for generating the radiology report or in a second mode for creating the A/V report 200. For example, FIGS. 4A and 4B are drawings of the NightRays graphical user interface (GUI) 28A and 28B (collectively, GUI 28), according to some embodiments. The GUI 28A is used by the radiologist to generate the radiology report. Typically, the radiologist generates the radiology report using a voice recognition program in "dictating mode." At any time during the dictation, the radiologist may toggle into "A/V report mode." The radiologist then generates the A/V report 200 and can then toggle back into dictating mode for generating the radiology report. Thus, while the A/V report 200 is separate from the radiology report, the radiologist may well generate the two reports together.

Figure 6:
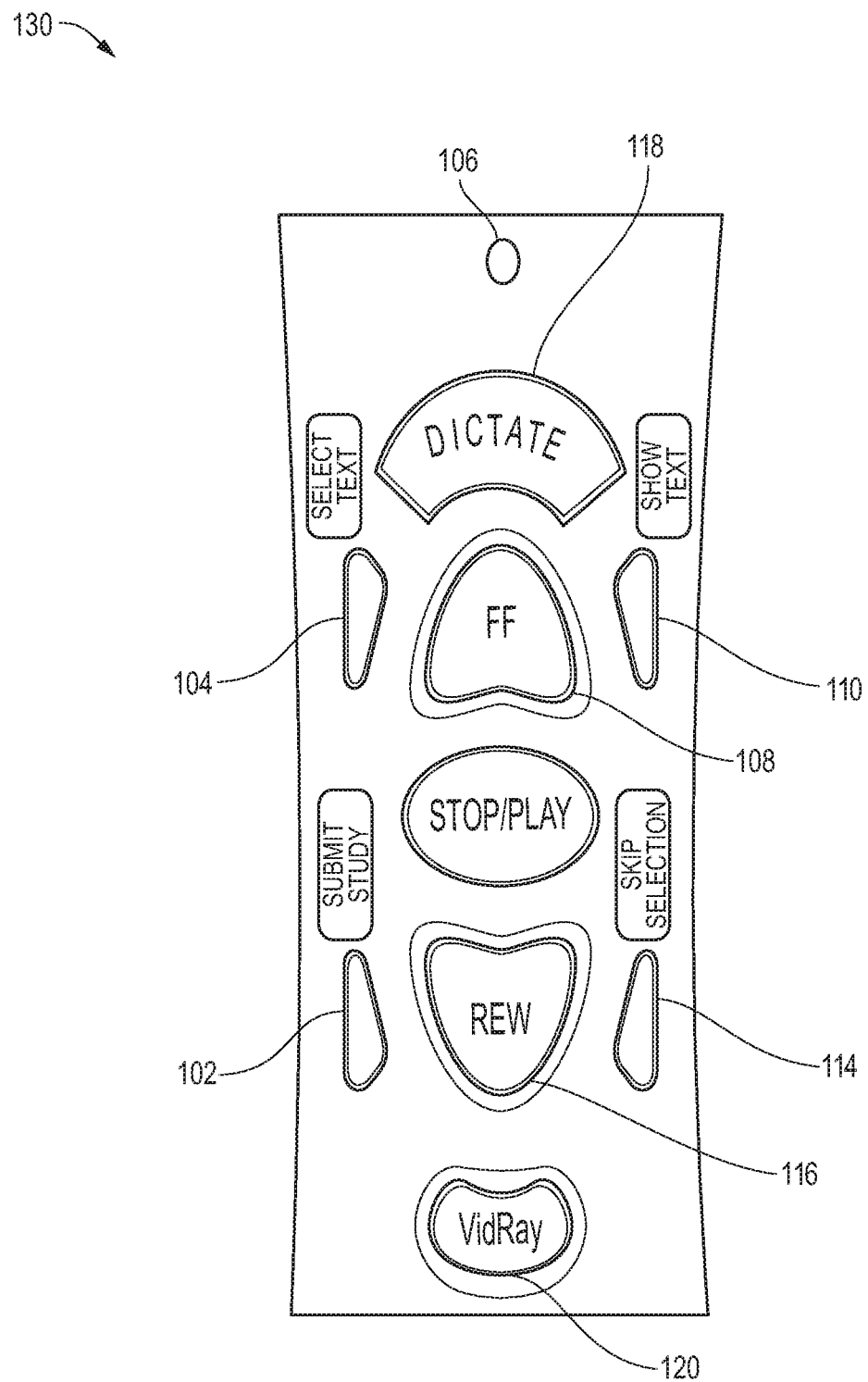
FIG. 6 is a diagram of a PowerScribe handset, including an assigned VidRay button for generating the audio/video report of FIG. 2, according to some embodiments.
Figure 8:
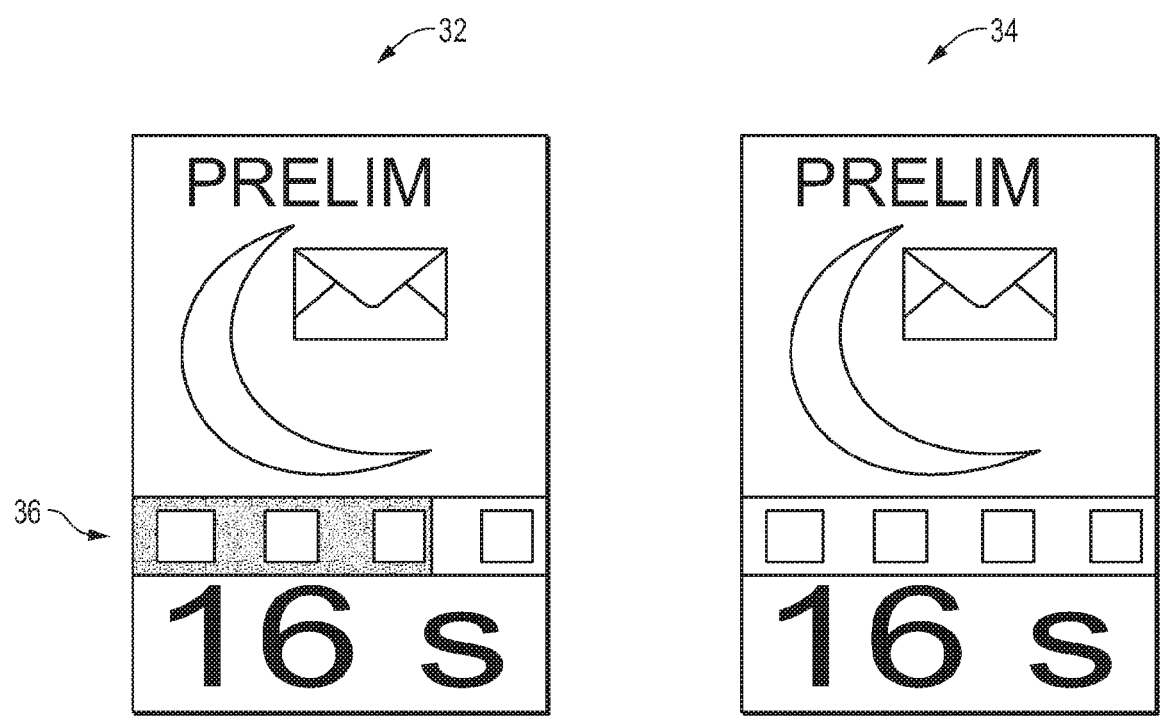
FIG. 8 is a diagram of an audio/video report indicator, which conveys download information, according to some embodiments.

FIG. 4A shows the GUI 28A with no marking. Thus, the GUI 28A is in dictating mode. The radiologist may invoke the A/V report mechanism 100 by selecting a VidRay button at the top of the screen. Alternatively, the radiologist may press a VidRay button 120 on the handset 130 (FIG. 6). Once the A/V report session 100 is invoked, the GUI 28B changes as depicted in FIG. 4B, with the background showing cross-hatches, and the screen capture box 62 being displayed (block 108). The GUI 28B is now in A/V report mode. Alternatively, the GUI 28A may be blue, indicating dictating mode and red to indicate A/V report mode. The radiologist may resize and position the box over an image to be analyzed (block 110). In some embodiments, the screen capture box 62 is positioned in a "last used location," that is, in the same position it was in when the A/V report session 100 was last invoked. In other embodiments, the screen capture box 62 is always positioned in a predetermined location on the screen. In still other embodiments, the screen capture box 62 appears wherever the mouse is pointing. Preferably, the screen capture box 62 is sized to not exceed that portion of the radiographic image 10 that needs to be viewed, as a larger sized box will use more storage space in the database 70 than a smaller sized box.

Figure 5A:
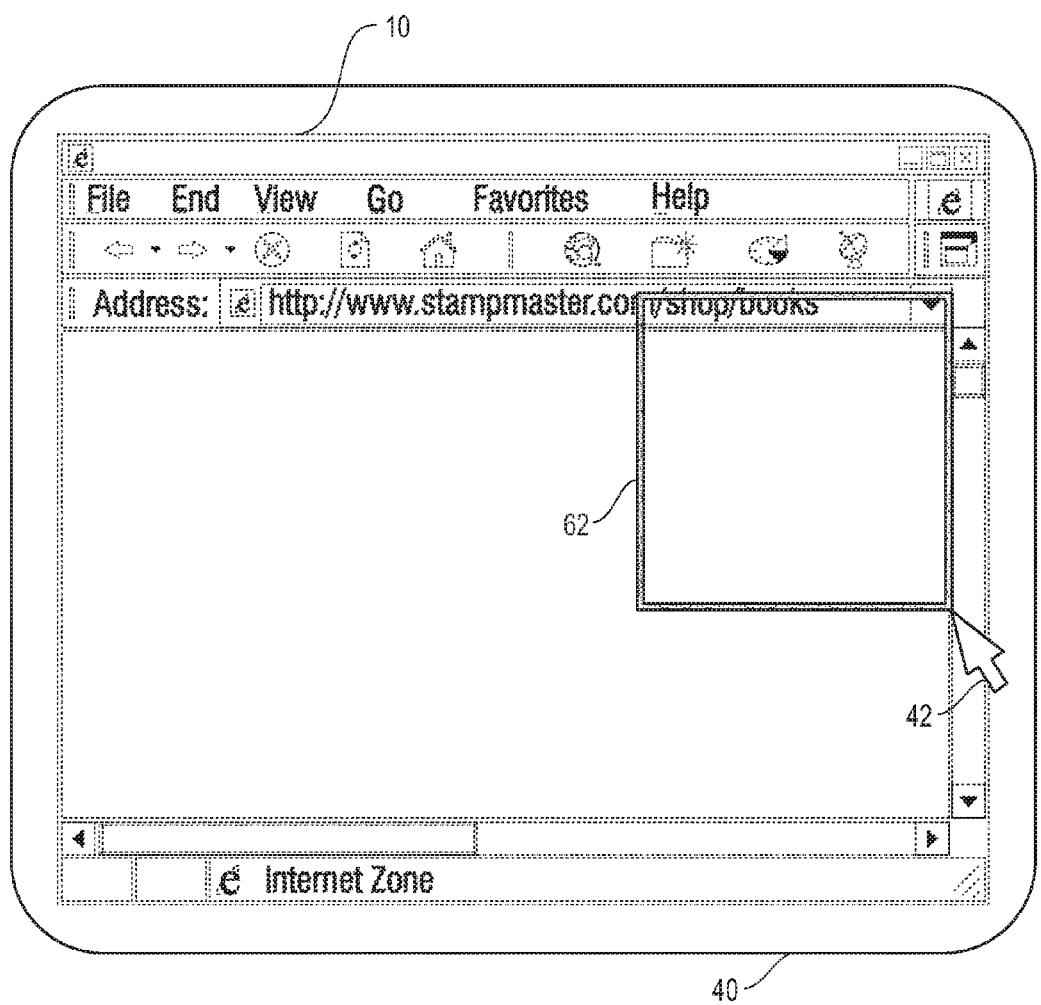
FIGS. 5A and 5B are diagrams of a video monitor display with a screen capture window that is manipulated by the radiologist before generating an audio/video report, according to some embodiments.
Figure 5B:
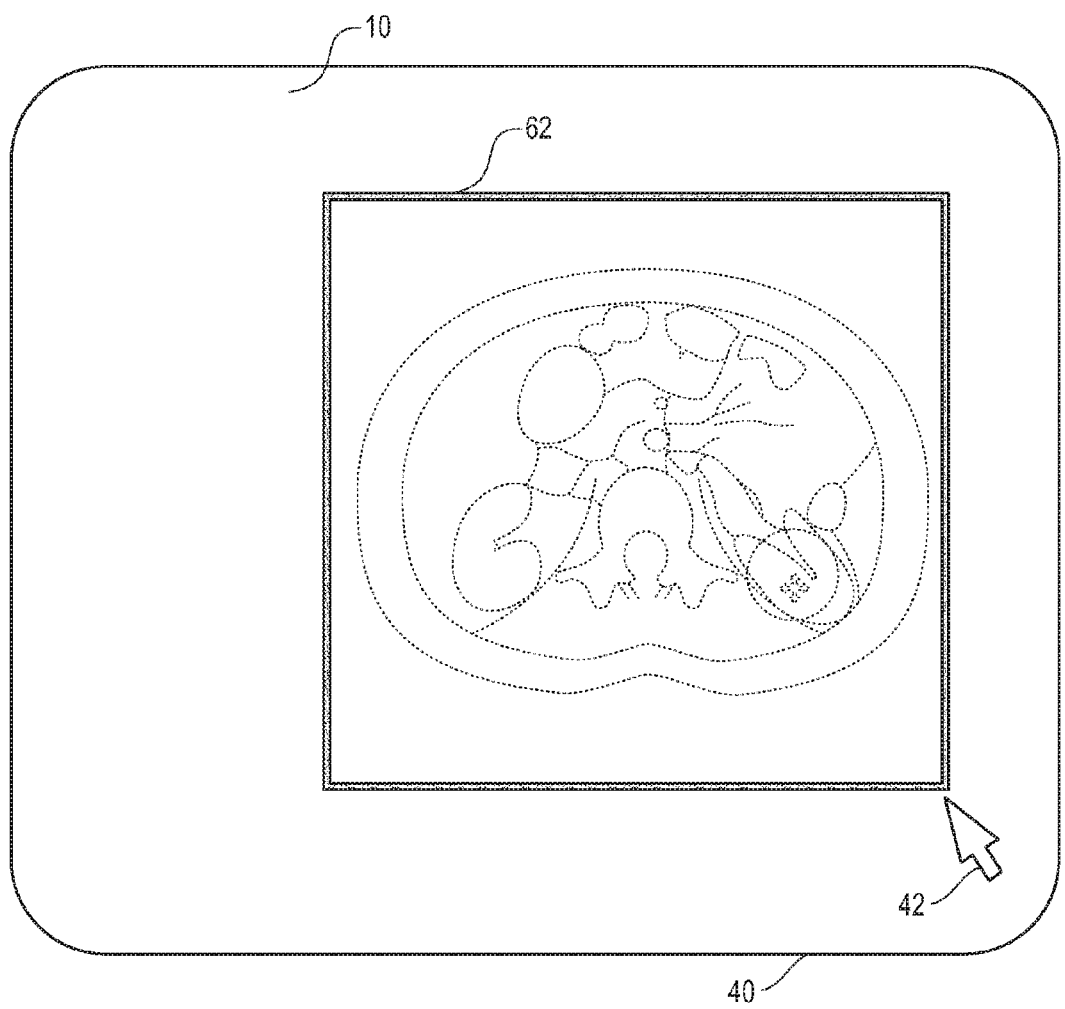

FIGS. 5A and 5B are diagrams of a video monitor 40 having a radiographic image 10 and a screen capture box 44. When the A/V report session 100 is invoked, a movable window, the screen capture box 44, appears on the monitor 40. The radiologist manipulates the screen capture box 44, which is transparent, until it sits over the portion of the radiographic image 10 to be discussed in the A/V report 200. The radiologist may select a portion of the image 10, as in FIG. 5A, or the entire image, as in FIG. 5B. Alternatively, the radiographic image 10 may constitute a series of images, such as when cross-sectional images of a body part are obtained.

In some embodiments, the radiologist may position the screen capture box 62 over virtually anything found on his computer monitor, including, but not limited to, radiographic images 10, web pages, still photographs, and videos. The A/V report 200 may be used, not just for diagnostic analysis of patient information, but also as a teaching tool.

Returning to FIG. 3, In addition to making the audio/video report 200 active, the screen capture box 62 visibly changes to indicate activity (block 118). In some embodiments, the screen capture box 62 is a first color when the audio/video report 200 is active and a second color when inactive. In FIG. 4B, for example, the screen capture box 44 is red, meaning that the audio/video report 200 is active. Other visual means may similarly be used to provide such indication. Once active, the radiologist may generate the audio/video report 200.

Once the screen capture box 62 is sized and positioned over the pertinent video data, the radiologist may invoke audio dictation (block 112).

As with the video capture 20, the audio recordation 40 portion of the A/V report generation method 100 may be invoked in several different ways. In a preferred embodiment, the handset (described in FIG. 6, below), includes a dictate button 106 for invoking the audio recording. In other embodiments, the RIS 80 may include a dedicated button on the screen to be selected for dictation. In still other embodiments, a keyboard key may be programmed to invoke audio dictation.

Once audio dictation is invoked (block 112), the radiologist begins speaking into a microphone about the selected image/video (block 114). (In some embodiments, it is only once the dictation has been invoked, not before, that the A/V report 200 is generated.) In some embodiments, the microphone 118 is part of the handset 130 (FIG. 6). In other embodiments, the microphone is part of the video monitor of the radiologist's computer. In still other embodiments, the microphone is a distinct piece of hardware accessible to the radiologist and connected to the computer.

In some embodiments, the handset 130 doubles as the dictation device for the radiology report (the legacy function) and as the audio device for producing the audio/video report 200. At this point, the audio/video report 200 is said to be active (FIG. 4B), while the radiology report window 28A is inactive (FIG. 4A). Persons of ordinary skill in the art recognize that a computer screen may present multiple windows in which some or all of each window is simultaneously visible, with only one of the multiple windows being active.

The display visually indicates that the A/V session 200 is being recorded (block 116). This may be by changing the color of the patient session in the RIS 80, such as in FIG. 4B, where the red background provides the indication. In other embodiments, a VidRay button on the handset blinks during the recording of the A/V session 200.

Figure 7:
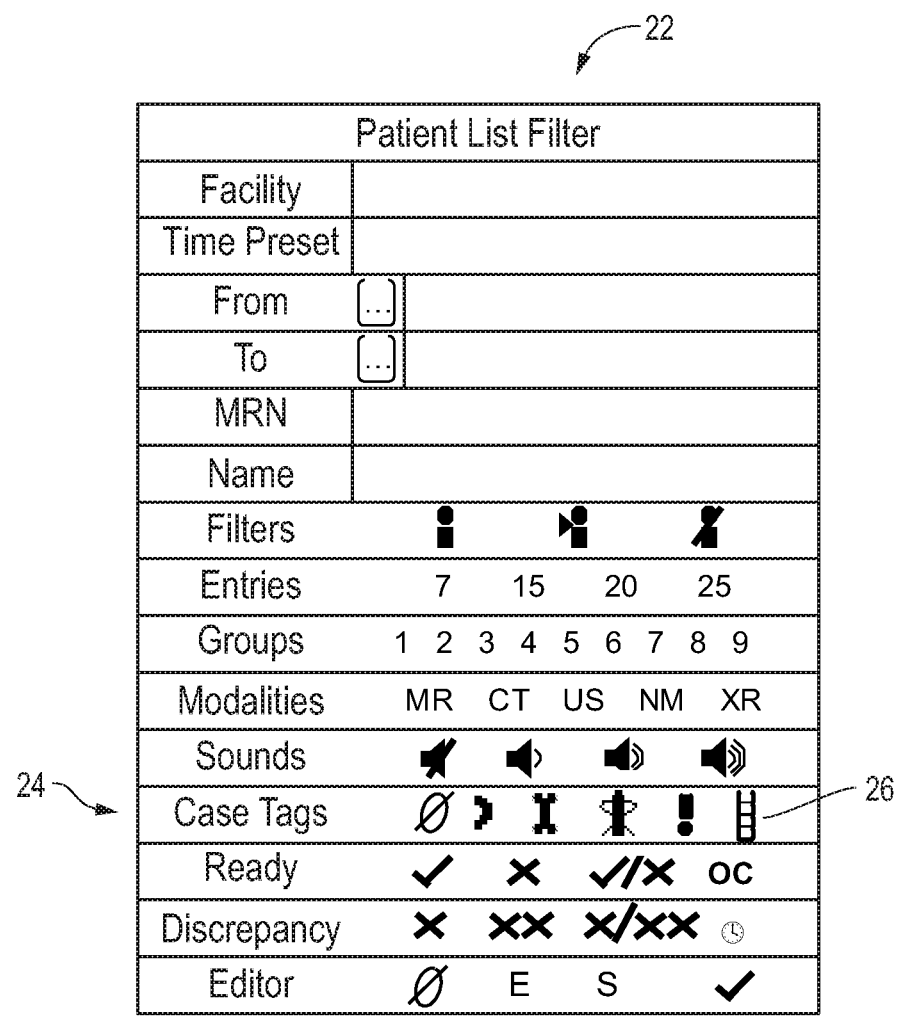

In some embodiments, the RIS 80 includes a series of case tags 24, as shown in FIG. 7, and also in FIGS. 4A and 4B, shown at the bottom of the GUIs 28A and 28B, respectively. These case tags indicate particular characteristics of the radiology report. A "VR" case tag, when checked, indicates that an A/V report 200 is being generated for the patient. In some embodiments, the VR case tag is checked as soon as the radiologist starts recording the A/V report 200 (block 118).

Although FIG. 3 describes the A/V report generation method 100 of FIG. 1, the flow diagram shows that the radiologist can readily toggle between generating/updating the A/V report 200 and generating/updating the radiologist report. Once the radiologist is finished with the A/V report 200, possibly temporarily, he may stop the audio and video recording, such as by selecting the A/V button on the handset, selecting the VidRay button on the patient session, selecting the defined key on the keyboard, or by other means (block 130). Unless the radiologist is ready to submit the A/V report 200 (block 122), the software 80 automatically returns to the radiology report mode (block 124). The radiologist may invoke audio dictation, such as by selecting a "dictate" button on the handset (block 126), and, by speaking into the microphone, audio of his voice is transcribed into text and automatically stored into the radiology report (block 128).

Until the A/V report generation 100 is again invoked, the audio/video report 200 remains inactive. Until the radiologist invokes the A/V report mechanism 100 again, the audio continues to be transcribed into the radiology report. The radiologist 20 may edit the report 50 at this time, but may not edit the audio/video report 200.

The radiologist may again invoke the A/V report generation 200 (block 130), such as by selecting the VidRay button on the handset (block 3). If so, the radiologist may again invoke dictation (block 112) and speak into the microphone (block 114), with the audio not being translated into text (as is done when in legacy mode), but being saved as part of the A/V report 200. The recording starts at the point where it had previously ended, in some embodiments. Again, the audio/video report 200 indicates that it is active.

The radiologist may thus toggle between radiology report mode and A/V report mode as many times as he desires until both reports are completed. Once the radiologist is satisfied that the report(s) are complete, he invokes a submit request (block 122). Again, the submit request may be a button on the handset, a selectable box on the video display, a dedicated key on the keyboard, and so on. In some embodiments, the radiologist may optional de-select the VR case tag 24. If the VR case tag 24 is de-selected, the A/V report 200 will not be saved when submit is selected. If the VR case tag 24 is selected, the A/V report 200 is saved along with the radiology report (block 124).

As indicated by the VR case tag 24, the audio/video report 200 is hereafter associated with the radiology report, allowing anyone reviewing the report access to additional information supplied by the radiologist. Once saved, the audio/video report 200 is part of the secure web-accessible database 70, along with the radiology report. In some embodiments, if the radiologist presses the VidRay button 120 three times (without pressing any other buttons) on the handset 130 (FIG. 5), the audio/video report 200 is erased. (This feature may be implemented for the other A/V invocation means as well.)

There may be several reports associated with each patient. There may be a preliminary report, a final report, a stat report, and so on. As used herein, the term "radiology report" is meant to cover these many reports generated by the radiologist in interpreting one or more radiographic images 10 of the patient. Likewise, there may be several A/V reports 200 generated for the patient. There may, for example, be an A/V report 200 for each radiographic image. Or, there may be multiple A/V reports 200 describing a single radiographic image.

The radiologist may use a handset to invoke the RIS 80 to generate the radiology report as well as the A/V report 200. FIG. 6 is a diagram of a PowerScribe handset 130 used to generate the A/V report 200, according to some embodiments. The handset 130 includes the following buttons: submit study 102, select text 104, dictate 106, fast forward 108, show text 110, stop/play 112, skip selection 114, rewind 116, and VidRay 120. The handset 60 includes a dictate button 1066, along with the stop/play button 112, the rewind button 116, and the fast-forward button 108, enable the radiologist to dictate the radiology report. The dictation is automatically converted from spoken words to text on the radiology report being displayed on the computer monitor 40. The submit study button 102, the select text button 104, the skip selection button 1144, and the show text button 110, also facilitate generating the radiology report.

The VidRay button 120 is used to invoke the A/V report mechanism 100, as described in FIG. 3, above. The VidRay button 120 further enables the radiologist to toggle between the audio/video report 200 and the radiology report as needed. The dictate button 106 is used whenever audio is to be recorded, whether to be transcribed for the radiographic report or to be incorporated as part of the A/V report 200. The submit study button 102 is used to save the radiographic report, the A/V report 200, or both studies.

In some embodiments, the handset 130 also includes a microphone 118, as shown. Using the handset 130 in legacy mode, the radiologist generates the radiology report by speaking into the handset microphone 118 with the dictate button 106, such that the words spoken by the radiologist are automatically translated into text that appears in the report. The microphone 118 also operates as a playback speaker, as well as a soundcard.

The radiologist then invokes the A/V report mode 100 (such as by pressing the VidRay button 120) to switch into generating an audio/video report 200, which also appears on the computer monitor 40. The computer monitor 40 is connected to a processor-based system, such as a desktop or laptop computer (not shown). In some embodiments, the processor-based system includes a microphone for recording the voice of the radiologist. In other embodiments, the handset 130 includes a microphone for this purpose.

For the radiologist preparing the radiology report of the radiographic image(s), the presentation of both the report and the audio/video report 200 on the computer monitor 40 facilitates generation the audio/video report. Both the radiology report and the audio/video report 200 are stored on the secure web-accessible database 70, possibly for a long time period. While the radiology report occupies some space, the audio/video report 200 is likely to occupy much more space, as video and audio files use more storage media than text files. Thus, in some embodiments, there is a maximum time period given for generating the audio/video report 200. In a preferred embodiment, the A/V report 200 is limited to 30 seconds in length.

The audio/video report generation method 100 also considers environments with multiple computer monitors. In some embodiments, the audio/video report window 200 can move to any monitor. Thus, for example, the radiology report may be on a first monitor while the audio/video report 200 is on a second monitor. In some embodiments, the audio/video report window 200 is a 600×600 window. In other embodiments, the audio/video report window 200 takes up the entire visual space of the computer monitor 40.

The secure web-accessible database 70 that stores the audio/video report 200 may include software 80 for accessing the contents of the database. When present, the software 80 may include case tags 24, such as are visible in FIG. 4A. The case tags 24 indicate characteristics of the stored data for a given patient.

FIG. 7 features a patient list filter 22 that is used to find patient entries in the database 70, according to some embodiments. The patient list filter 22 includes case tags 24, which enable a user of the database to find patients with certain characteristics, such as those known as interesting cases, those with no active diseases, and so on. A VidRay case tag 26 allows the database user to search for all patients for whom an audio/video report 200 is generated. In FIG. 7, the VidRay case tag 26 looks like a film strip, but may be any desired visual icon.

In some embodiments, the software 80 also includes visual indicators, or graphical icons, to let the radiologist 20 know that the audio/video report 200 has been downloaded to the database 70. Because the A/V report 200 may be a large file, the download of the file may take some time. In some embodiments, the A/V report 200 is a Windows Media Player file, with a .wmv extension. (Windows Media Player is a product of Microsoft Corporation, of Redmond, Wash.) Windows Media Player files may be streamed to the user while they are being downloaded.

FIG. 7 is a diagram of two graphical icons 32, 34 that are used to indicate the download status of the audio/video report 200. The icon 32 indicates that the audio/video report 200 is being downloaded to the database 70. In some embodiments, the filmstrip 36 of the icon 32 blinks as the download is taking place, then stops blinking once the download is complete. In the icon 34, the filmstrip 36 is white, indicating that the download of the audio/video report 200 is complete.

Like the radiology report, the A/V report 200 is a client record. As such, the RIS 80 includes some protections, in some embodiments, to ensure that the A/V report 200 is available on a limited basis, in compliance with the Healthcare Insurance Portability and Accountability Act (HIPAA).

In some embodiments, the A/V report 200 may be distributed using electronic mail, again, with HIPAA compliance in mind.

While the A/V report 200 and A/V report generation method 100 were originally developed for creating audio/video consults on standard radiographic images, the report 200 and method 100 could also be used for creating explanations or consults on any medical imaging.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A system having a storage and hardware processor processes and generates a combined audio and video report of a radiographic image, the system comprising:
   a video recording of the one or more radiographic images, wherein the video recording is to be viewed on a display of the system;
   an audio recording of a radiologist describing one or more features of the radiographic image, wherein the audio recording enables the voice of the radiologist to be heard while viewing the video recording; and
   a play menu for playing the video and audio recording, wherein the video and audio recording is played:
      from within a radiology information system program executable on the system, the radiology information system program comprising a graphical user interface to facilitate retrieval of patient data stored in the storage, wherein the video recording, the patient data, and the play menu are simultaneously viewable on the display of the system, and the audio recording is playable while viewing the video recording, the patient data, and the play menu; or
      as a standalone program executable on the system or on any other system having media player software;
   wherein the audio/video report is stored in the storage for subsequent retrieval and playback.

2. The system of claim 1, the video recording further comprising:
   a mouse pointer movement stream traversing over the video recording;
   wherein the movement stream indicates the described one or more features.

3. The system of claim 1, wherein the radiographic image comprises a still image.

4. The system of claim 1, wherein the radiographic image comprises a video image.

5. The system of claim 1, the radiographic image comprising a series of cross-sectional images of a body part, wherein the series of images is scrolled during the video recording.

6. The system of claim 1, wherein the radiographic image is selected from a group consisting of magnetic resonance imaging, computed tomography, ultrasonography, nuclear medicine, x-ray, plain film, angiography, and fluoroscopy.

7. The system of claim 1, wherein the play menu comprises a play button, a stop button, a rewind button, and a fast-forward button;
   wherein the play menu appears either on the graphical user interface of the radiology information system program or on a graphical user interface of the stand-alone program.

8. The system of claim 7, the play menu further comprising:
   a volume slider to enable adjustment of the volume of the audio/video report during playback; and
   a seek slider to indicate where the audio/video report is being played; wherein the seek slider is adjustable to play at any time location in the report.

9. The system of claim 1, wherein the audio/video report is a streaming file.

10. The system of claim 9, wherein the streaming file is a windows media player (.wmv) file.

11. The system of claim 1, wherein the audio recording is up to thirty seconds long.

12. A method for generating an audio/video report of a radiographic image of a patient, the method comprising:
   selecting a patient case from a radiology information system, the radiology information system comprising a graphical user interface presented to a video display, the graphical user interface for retrieving from a database a collection of patient data including radiographic images, wherein a patient history of the patient case is viewable on the video display when the patient case is selected;
   launching an audio/video report session for the selected patient, the audio/video report to activate a screen capture box and deactivates the graphical user interface when the session is launched, wherein a video recording of the contents of the screen capture box commences when the session is launched;
   adjusting the screen capture box over one or more retrieved radiographic images of the selected patient, wherein the contents of the screen capture box continue to be recorded;
   invoking audio dictation; and
   speaking into an audio receiving device about the one or more radiographic images to produce an audio recording, wherein the received audio is recorded as the video recording is being generated;
      wherein the audio/video report comprising the audio recording and the video recording is either played from within the radio information system using a control panel or is played as a program executable on a processor-based system.

13. The method of claim 12, further comprising:
moving a mouse over the radiographic image disposed inside the screen capture box while recording the audio, wherein the mouse movement is seen in the video recording.

14. The method of claim 12, further comprising:
scrolling through a series of radiographic images disposed inside the screen capture box while recording the audio, wherein the scrolling of the series of radiographic images is seen in the video recording.

15. The method of claim 12, further comprising:
pausing the audio/video report session, wherein the screen capture box is deactivated and the graphical user interface is activated; and
accessing a radiology report of the radiographic images, wherein the audio/video report is a supplement to the radiology report.

16. The method of claim 15, further comprising:
relaunching the audio/video report session, wherein the screen capture box is again activated, the video recording is again commenced, and the graphical user interface is again deactivated; and
reinvoking audio dictation; and
speaking further into the audio receiving device about the one or more radiographic images, wherein the received audio is recorded after the spoken words previously recorded.

17. The method of claim 16, invoking audio dictation further comprising:
pressing a dictate button on a handset, wherein the dictate button is used for both invoking and reinvoking audio dictation.

18. The method of claim 16, launching an audio/video report session further comprising:
pressing a predefined button on a handset, wherein the predefined button is used for both launching and relaunching the audio/video report.

19. The method of claim 16, further comprising:
invoking a submission of the audio/video report such that the audio/video report is saved in the database, wherein the audio/video report comprises:
the video recording of the contents of the screen capture box upon submission;
the recorded audio; and
a playback menu for subsequent playback of the audio/video report.

20. The method of claim 15, further comprising:
invoking audio dictation;
speaking into the audio receiving device about the one or more radiographic images, wherein the received audio is transcribed into text, the text to be stored in the report.

* * * * *